United States Patent [19]

Izumi et al.

[11] Patent Number: 4,641,526
[45] Date of Patent: Feb. 10, 1987

[54] METHOD AND APPARATUS FOR ESTIMATING SOUND SOURCE POSITION

[75] Inventors: Shigeru Izumi, Tokyo; Makoto Senoh, Ibaraki; Koji Tsumaki, Hitachi; Kenji Miyata, Katsuta, all of Japan

[73] Assignee: Hitachi, Ltd., Tokyo, Japan

[21] Appl. No.: 617,500

[22] Filed: Jun. 5, 1984

[30] Foreign Application Priority Data

Jun. 6, 1983 [JP] Japan ................ 58-99401

[51] Int. Cl.⁴ .......................................... G01N 29/00
[52] U.S. Cl. ........................................ 73/572; 73/587; 364/460; 367/124; 367/127
[58] Field of Search ............... 367/124, 125, 127; 73/572, 587; 364/460

[56] References Cited

U.S. PATENT DOCUMENTS

| | | | |
|---|---|---|---|
| 3,559,161 | 1/1971 | Raudsep | 367/127 |
| 4,009,463 | 2/1977 | Vercellotti et al. | 367/127 |
| 4,317,186 | 2/1982 | Nishi et al. | 367/127 |
| 4,357,167 | 9/1982 | Hashimoto et al. | 367/127 |
| 4,425,500 | 1/1984 | Knight et al. | 367/127 |
| 4,459,851 | 7/1984 | Crostack | 73/587 |
| 4,472,971 | 9/1984 | Marini et al. | 367/127 |
| 4,481,818 | 11/1984 | Hellquist | 73/587 |

Primary Examiner—Howard A. Birmiel
Attorney, Agent, or Firm—Antonelli, Terry & Wands

[57] ABSTRACT

Method and apparatus for estimating the location of an unknown sound source in a structure to be monitored, wherein sounds from at least three known sound sources are detected by a plurality of detectors. At least one of peak value data and signal arrival time data derived from the outputs of the detectors are classified for each of the known sound sources and stored in a storage. Pattern differences from each of the known sound sources to a number of predetermined positions respectively, are calculated to prepare for each of the known sound sources a correspondence table indicating relationships between the calculated pattern difference and the real distances from the known sound source positions to the predetermined positions, the correspondence table being stored in a storage. The pattern differences for each of the known sound source positions are calculated on the basis of the sound signal data derived through detection of a sound from an unknown sound source and the data stored in the storage. The real distances each for the known sound source are read out from the correspondence table on the basis of the calculated pattern differences and displayed on a display device to thereby estimate the location of the unknown sound source.

11 Claims, 12 Drawing Figures

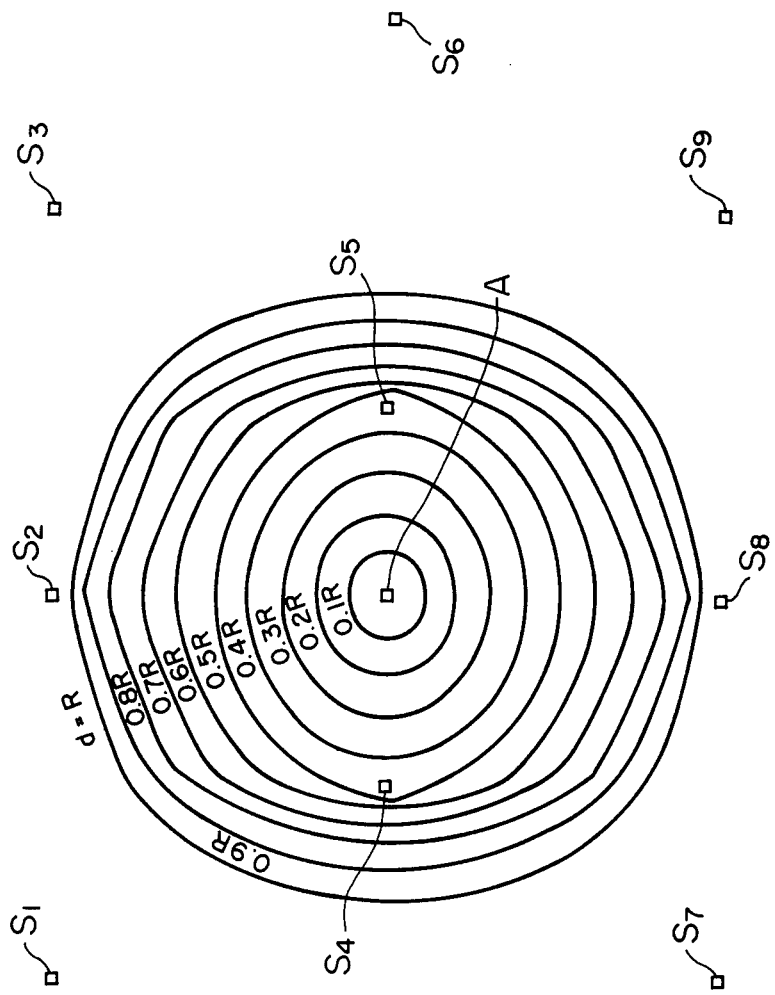

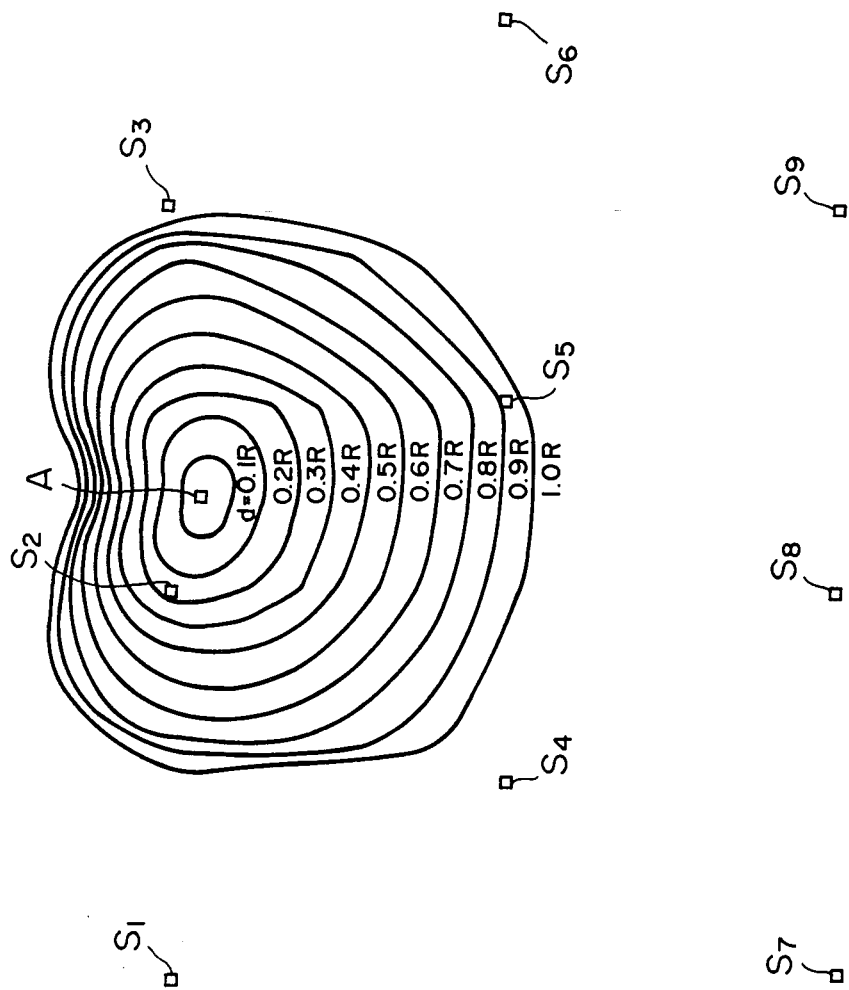

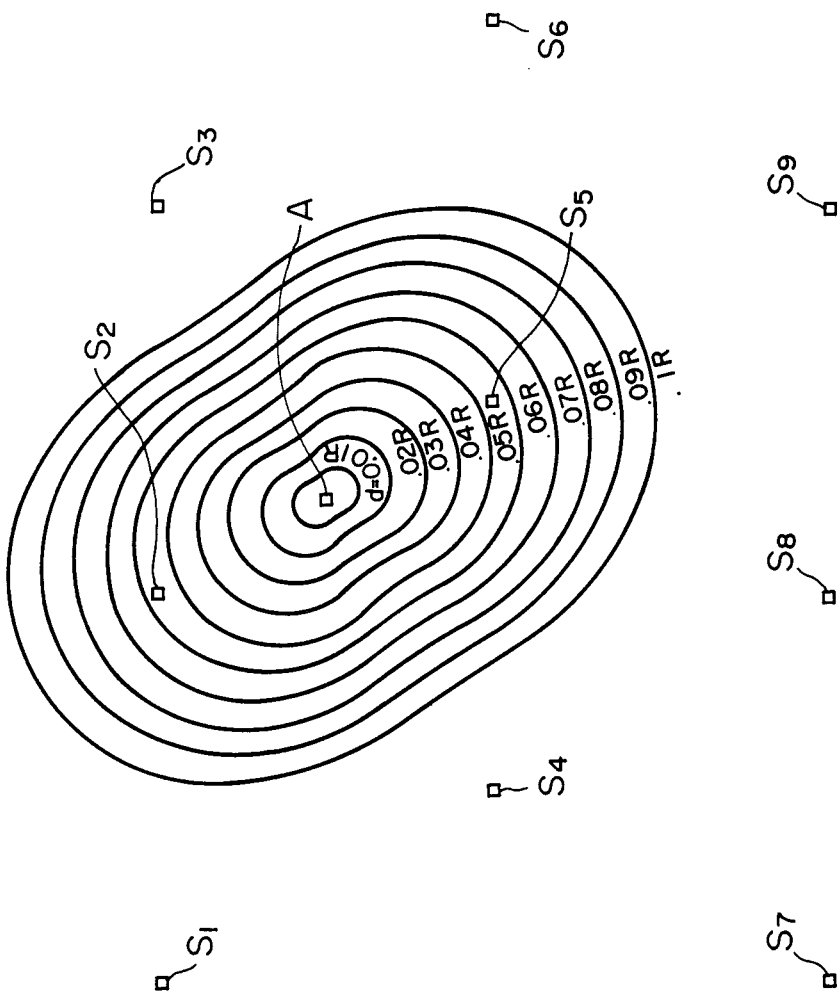

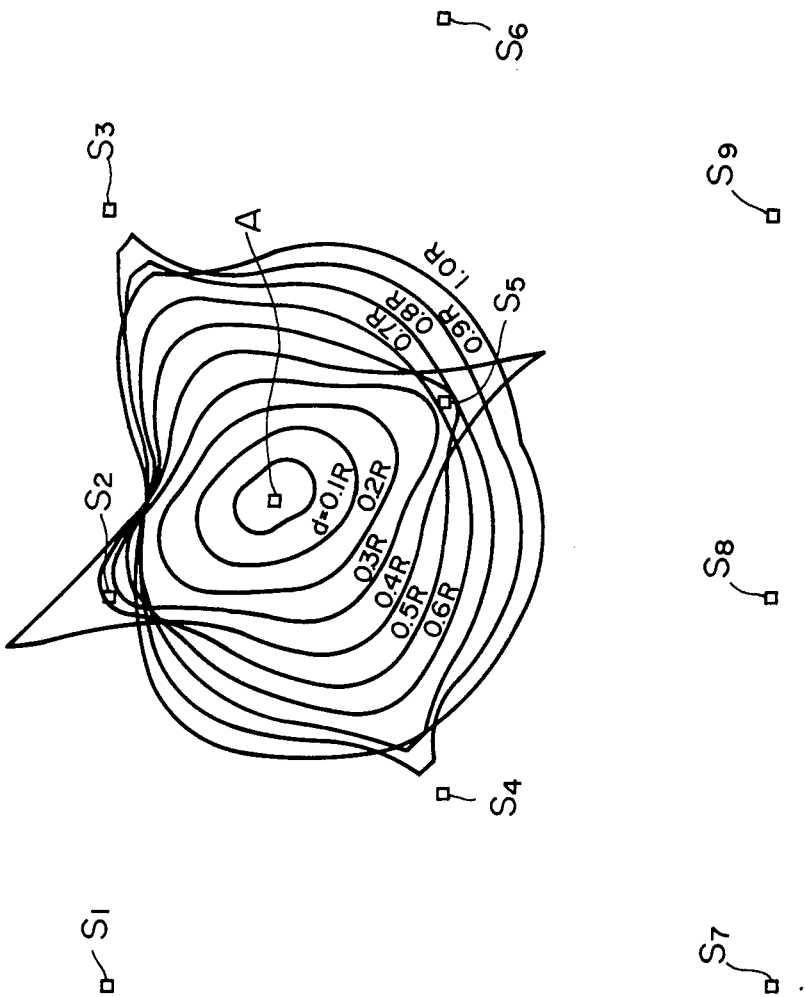

METHOD AND APPARATUS FOR ESTIMATING SOUND SOURCE POSITION

BACKGROUND OF THE INVENTION

The present invention relates to a method and an apparatus for estimating or evaluating a position of a sound source in a structure being monitored. More particularly, the invention concerns a method and an apparatus which are advantageously suited to be used for detection of a position or location of a foreign or loose part within a structure such as, for example, a pressure vessel by estimating the position at which a sound is generated due to collision of the foreign or loose part with the structure.

According to a hitherto known method of estimating or evaluating a position of a sound source within a structure, such as a pressure vessel, peak value data and arrival time difference data derived from sound signals, originating from a number of known sound sources whose positions within the structure are previously known, are stored in the form of a file in a memory of a computer system, wherein comparison between patterns from the known sound sources and a pattern from a a position or location of an unknown sound generated by a foreign or loose part is arithmetically determined for each of the known sound sources, and the position of the known sound source which corresponds to the minimum or smallest difference is estimated to be the position or location of the unknown sound source, as is disclosed in U.S. Pat. No. 4,352,167. This known method is based on a pattern recognition procedure for comparing or correlating the data of the unknown sound source with the data of the known sound sources stored in the memory by making use of the fact that the pattern differences which are relied upon to indicate the distances from the known sound sources to the unknown sound source have significant correlations or proportional relations with the real or actual distances. However, in the case where the structure is not of a simply planar configuration, but has bends and openings in a complicated geometrical configuration as in most practical applications, difficulty is encountered in establishing a well defined proportional relation between the pattern difference and the actual or real distance. Consequently, even when the known sound source of which pattern difference from an unknown sound source is minimum can be retrieved from the file stored in the memory, there may arise a situation in which the real distance between the unknown sound source and the known sound source retrieved from the memory is not actually the shortest, resulting in an error in the estimation of the position of the unknown sound source with an appreciably high probability, which is a disadvantage. In order to improve the accuracy of estimation, it is required to increase the number of the known sound sources, which number is however limited in practical applications in view of the difficulty in providing the known sound sources due to the physical restriction imposed by the structure and a limitation in the capacity of the memory or storage.

The pattern difference is defined by a mathematical expression or model so as to have a predetermined correlation with a real distance. Such definition is discussed in the Shigeru Izumi's paper A22 titled "Estimation Of Sound Source Position In Pressure Vessel By Pattern Recognition Method" of a preparatory lecture collection for a session of the Japanese Atomic Energy Society held Sept. 20, 1982. It is reported that although there exists a reasonable correlation between the pattern difference and the real distance, significant deviations are nevertheless noted.

SUMMARY OF THE INVENTION

An object of the present invention is to provide a method and an apparatus which are capable of estimating or evaluating the position of an unknown sound source with an improved accuracy even when a pattern difference which provides the measure for a real distance is not in a proportional relationship to the latter.

Another object of the present invention is to provide a sound source position estimating method and apparatus which can estimate the position or location of an unknown sound source with a high accuracy by using a reduced number of known sound sources.

According to an aspect of the present invention, it is proposed that pattern differences determined by comparing or correlating data of known sound sources with data of an unknown sound source through a pattern recognition procedure are transformed to a real or actual distance with the aid of a correspondence table which contains relations between the pattern distances and actual or real distances determined previously, to thereby allow the position or location of the unknown sound source to be estimated with a high accuracy. In case the relations between the pattern distances and real distances are previously determined through experiment and simulation, the real distance can be determined offhand from the pattern difference.

According to another aspect of the invention, there is provided a sound source position estimating apparatus which comprises at least three sound sensor or detector means mounted at suitable locations on a structure to be monitored for detecting the sound of a collision by a loose part generated at any position within the structure, known data storing means for storing at least one of peak value data and signal arrival time data corresponding to a number of known sound source positions and a correspondence table indicating the relationships between the pattern differences and the real distances, and data processing means for determining a pattern difference on the basis of at least one of peak value data and signal arrival time data of a sound signal originating in an unknown sound source and produced by the sound sensor or detector means and the corresponding data of the known data storage means, the pattern difference thus determined being then transformed to the corresponding real distance by referring to the correspondence table.

BRIEF DESCRIPTION OF THE DRAWINGS

The above and other objects, features and advantages of the invention will be more apparent upon consideration of the following detailed description of the preferred embodiments of the invention made by referring to the accompanying drawings, in which:

FIGS. 2, 3, 4 and 5 are views for illustrating, respectively, examples of pattern distances defined by the method illustrated in FIG. 1;

DESCRIPTION OF THE PREFERRED EMBODIMENT

Figure 1:
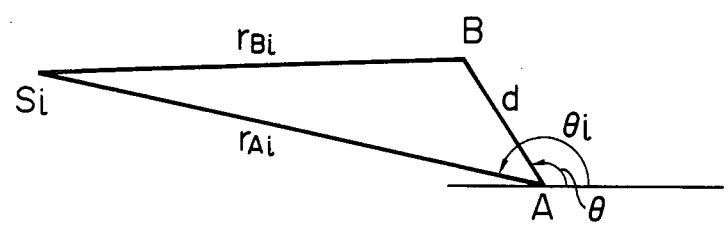
FIG. 1 is a view for illustrating the concept of a method of estimating a sound source position through pattern recognition procedure according to the invention.

In the following, the invention will be described in detail by referring to the drawings.

In the first place, the description will be directed to a method of detecting or evaluating the position of a sound source through a pattern recognition procedure according to the teaching of the invention.

As mentioned hereinbefore, the sound source position estimating or evaluating method according to the invention resides in that a sound generated due to collision of a foreign or loose part within a structure to be monitored is detected with the aid of three or more sound transducers or detectors (sensors) installed at appropriate locations in the structure under consideration, patterns are prepared from the data about the peak values and the signal arrival time of the sound signal available from the outputs of the sound detectors, and that a so-called pattern difference between two sound sources A and B (e.g. a known sound source A and an unknown sound source B) is defined on the basis of the patterns thus prepared, whereby the real distance between the sound sources A and B is determined on the basis of the pattern difference.

Now, it is assumed that a known sound source A and an unknown sound source B are detected by means of N spaced sound detectors or sensors. A peak-value (or amplitude) pattern difference $D_{AB}^A$ is defined on the basis of the data about the peak values or amplitudes of the sound from the sound sources A and B as follows:

$$D_{AB}^A = \left\{ \frac{\mathrm{Var}(\ln a_i - \ln b_i)}{\sqrt{\mathrm{Var}(\ln a_i) \cdot \mathrm{Var}(\ln b_i)}} \right\}^{\frac{1}{2}} \quad (1)$$

where $a_i$ and $b_i$ represent, respectively, the peak values of the sounds produced by the sources A and B and detected by the i-th sound detector $S_i$ (where i is a given integer of 1 to N), and Var represents variance and can be defined for a given quantity $X_i$ by the following expression:

$$\mathrm{Var}(X_i) = \frac{1}{N} \sum_{i=1}^{N} (X_i - \overline{X})^2 \quad (2)$$

where N represents the number of the detectors or sensors installed and $\overline{X}$ is given as follows:

$$\overline{X} = \frac{1}{N} \sum_{i=1}^{N} X_i \quad (2')$$

In connection with the expression (1), $X_i$ corresponds to $\ln(a_i/b_i)$, $\ln a_i$ and $\ln b_i$. As will be seen, the pattern difference defined by the expression (1) represents a value related to the real distance between the known sound source A and the unknown sound source B as determined on the basis of the peak value data available from the N sound detectors for the one known sound source and the one unknown sound source.

In the similar manner, an arrival time difference pattern difference $D_{AB}^T$ which is based on the data of signal arrival times of the sounds from the sources A and B is defined as follows:

$$D_{AB}^T = \{\mathrm{Var}(\tau_{Ai} - \tau_{Bi})\}^{\frac{1}{2}} \quad (3)$$

where $\tau_{Ai}$ and $\tau_{Bi}$ represent time points at which the sound signals from the sound sources A and B arrive, respectively, at the detector $S_i$.

Although the actual or real distance d between the sound sources A and B can be estimated by either one of the pattern differences $D_{AB}^A$ and $D_{AB}^T$, it is also possible to estimate the real distance d on the basis of another pattern difference $D_{AB}^C$ which is defined as a combination of both the pattern distances $D_{AB}^A$ and $D_{AB}^T$ in accordance with the following expression:

$$D_{AB}^C = (1-\alpha)D_{AB}^T + \alpha D_{AB}^T \quad (4)$$

where $\alpha$ represents a factor of a value in the range of $0 \leq \alpha \leq 1$ and relates to a weight for weighted mean.

Next, elucidation will be made on how accurately the pattern differences defined above can define or represent the real distance d. If the pattern difference is a quantity which is perfectly in proportion to the real distance, the real distance between the sound sources can be determined offhand on the basis of the pattern difference. However, in practice, such proportional relationship does not exist validly.

It is now assumed that the sound sources A and B and the sound detector $S_i$ (where i = 1, 2 ..., N) are located in such a geometrical positional relationship as illustrated in FIG. 1. On the assumption, the peak values $a_i$ and $b_i$ of the sound signals produced by the sound sources A and B and picked up by the sound detector $S_i$, respectively, can be given by the following expressions:

$$\left. \begin{array}{l} a_i = K_A \cdot r_{Ai}^{-J} \\ b_i = K_B \cdot r_{Bi}^{-J} \end{array} \right\} \quad (5)$$

where $K_A$ and $K_B$ represent proportional constants which depend on the sound intensities of the sound sources A and B and the detection sensitivity of the sound detectors $S_i$, while $r_{Ai}$ and $r_{Bi}$ represent, respectively, distances from the sound sources A and B to the detector $S_i$ and J represents an attenuation or damping constant.

Furthermore, the signal arrival time points $\tau_{Ai}$ and $\tau_{Bi}$ at which the sound signals originating in the sound sources A and B arrive at the sound detector $S_i$ are given by the following expressions:

$$\left.\begin{array}{l}\tau_{Ai} = \dfrac{r_{Ai}}{V} \\ \tau_{Bi} = \dfrac{r_{Bi}}{V}\end{array}\right\} \quad (6)$$

where V represents the velocity of sound.

It will be seen that the signal arrival times $\tau_{Ai}$ and $\tau_{Bi}$ represent time delays intervening between the generation of sound at the sources A and B and the detection by the detector $S_i$. However, since the actual time point at which the sound is generated can not be known in practice, the sound arrival time points are determined in the relative sense as the differences among the time points at which the sound arrives at the N sound detectors (referred to arrival time difference). In this connection, it is noted that the pattern difference defined by the expression (3) can be determined equally on the basis of either the time delays or the arrival time differences mentioned above.

In the light of the expression (5), the expression (1) can be rewritten as follows:

$$D^A_{AB} = \left(\dfrac{\mathrm{Var}(\ln r_{Ai} - \ln r_{Bi})}{\sqrt{\mathrm{Var}(\ln r_{Ai}) \cdot \mathrm{Var}(\ln r_{Bi})}}\right)^{\frac{1}{2}} \quad (7)$$

It will be seen that the proportional constants $K_A$ and $K_B$ as well as the damping constant J can be cancelled. Similarly, in view of the expression (6), the expression (3) can be rewritten as follows:

$$D^T_{AB} = \dfrac{1}{V} \cdot \{\mathrm{Var}(r_{Ai} - r_{Bi})\}^{\frac{1}{2}} \quad (8)$$

When the cosine theorem is applied to the relationship illustrated in FIG. 1, the following expression (9) applies:

$$r_{Bi}^2 = r_{Ai}^2 + d^2 - 2r_{Ai} d \cdot \cos(\theta_i - \theta) \quad (9)$$

where d represents the actual distance between the sound sources A and B, $\theta_i$ represents an angle formed between a given reference coordinate axis and a line segment $\overline{AS_i}$, and $\theta$ represents an angle formed between the reference coordinate axis and a line segment $\overline{AB}$.

In the light of the above expression (9), the expressions (7) and (8) can be, respectively, rewritten as follows:

$$D^A_{AB} = \left(\dfrac{\mathrm{Var}\{\ln r_{Ai} - \frac{1}{2}\ln(r_{Ai}^2 + d^2 - 2r_{Ai} \cos(\theta_i - \theta))\}}{\sqrt{\mathrm{Var}(\ln r_{Ai}) \cdot \mathrm{Var}[\frac{1}{2}\ln\{r_{Ai}^2 + d^2 - 2r_{Ai} d \cdot \cos(\theta_i - \theta)\}]}}\right)^{\frac{1}{2}} \quad (10)$$

$$D^T_{AB} = \dfrac{1}{V} \cdot \{\mathrm{Var}(r_{Ai} - \sqrt{r_{Ai}^2 + d^2 - 2r_{Ai} d \cdot \cos(\theta_i - \theta)})\}^{\frac{1}{2}} \quad (11)$$

In the above expressions (10) and (11), values of the distance $r_{Ai}$ and the angle $\theta_i$ can be naturally determined so far as the positions of the sound detector $S_i$ (i=1, 2, ..., N) and the known sound source A are known. In other words, the pattern distances $D_{AB}^A$ and $D_{AB}^T$ given by the expressions (10) and (11) are, respectively, functions of the distance between the sound sources d and the angle $\theta$. Unless the pattern differences $D_{AB}^A$ and $D_{AB}^T$ given by the expressions (10) and (11) depend on the angle $\theta$, mapping of the sound source B lying on a circle depicted about the sound source A and having a radius d will result in a circle.

FIGS. 2 to 4 illustrate typical examples of the pattern differences $D_{AB}^T$ and $D_{AB}^T$ determined in accordance with the expressions (10) and (11) for given positions or locations of the sound detectors $S_i$ and the known sound source A. In these examples, it is assumed that nine sound sensors or detectors $S_1$ to $S_9$ are installed on an outer wall of a cylindrical pressure vessel in such a disposition in which triplets of the sound detectors $S_1$, $S_2$ and $S_3$; $S_4$, $S_5$ and $S_6$; $S_7$, $S_8$ and $S_9$ are, respectively, located in axially different planes of the cylindrical vessel, wherein the sound detectors belonging to each triplet are circumferentially distributed so as to divide the outer periphery of the cylindrical vessel at an equal angle.

In FIGS. 2 to 4, the cylindrical vessel is shown as developed in the planar state.

First, reference is made to FIG. 2 which illustrates results of calculation of the pattern distance $D_{AB}^T$ in accordance with the expression (11) on the assumption that the unknown sound source B is located on a given one of concentric circles around the center or the known sound source A at real distances or radii $d = m \cdot R$ (m=0.1, 0.2, 0.3, ..., 1.0). In other words, each of the closed curves shown in FIG. 2 represents the arrival time pattern distances, wherein the angle $\theta$ is varied with the real distance d being constant, which distance d assumes ten different values corresponding to ten equal divisions of R which in turn represents the length of a side of a regular triangle having apexes at which the sound detectors $S_i$ are located, respectively. Here, it should be mentioned that the pattern difference $D_{AB}^T$ is a value of no dimensions (or dimensionless value) which is correlated with the real distance d and calculated on the basis of the time information. By multiplying the value of the pattern difference $D_{AB}^T$ with an appropriate constant, the map of the pattern difference $D_{AB}^T$ is represented on a reduced scale. As will be seen in FIG. 2, even if the unknown sound source B should be positioned on a perfect concentric circle around the known sound source A, the map of that concentric circle and hence the pattern difference $D_{AB}^T$ can not be depicted in a perfect concentric circle but will undergo distortion more or less in dependence on the angle $\theta$ indicative of the direction of the unknown sound source B. Additionally, it will be seen that the distances among the individual closed curves are not constant and that the pattern difference $D_{AB}^T$ is not perfectly in proportion to the distance d between the sound sources A and B.

In the case of the illustrative example shown in FIG. 3, the known sound source A is displaced to a position which differs from that of the source A shown in FIG. 2. In this case, the distortion of the pattern difference $D_{AB}^T$ is more remarkable.

Referring to FIG. 4, there are illustrated results of calculation of the pattern difference $D_{AB}^A$ in accordance with the expression (10). In this case, it is assumed that the unknown sound source B is located on a given one of the concentric circles having the center at the known sound source A at a radius $d = m \cdot R$ (m=0.01, 0.02, 0.03, ..., 0.1). It is to be noted that the pattern difference $D_{AB}^A$ is illustrated on a reduced scale through multiplication of a given constant. As will be seen in FIG. 4, the pattern difference $D_{AB}^A$ can not be plotted in a concentric circle but is subjected to distortion as in the case of the pattern difference $D_{AB}^T$. Further, in the case of the illustrative example shown in FIG. 5, the radius $d=m \cdot R$ (m=0.1, 0.2, ..., 1.0) is reduced to 1/10 although the position of the known sound source A is same as the one shown in FIG. 4. It will be seen that the distortion is more remarkable and in an extreme case, the pattern difference $D_{AB}^A$ of a larger value is mapped in a closed curve having a smaller radius d than the pattern difference $D_{AB}^A$ of a smaller value. Such reversal may be explained by the fact that, when a sound source known or unknown is present in close proximity to some sound detector, the distance $r_{Ai}$ or $r_{Bi}$ in the expression (7) or (10) approximates zero, resulting in the logarithmic value thereof becoming negatively infinite. Thus, the pattern difference $D_{AB}^A$ may assume an extremely large value when a corresponding sound source is located in the close vicinity of the relevant sound detector.

As will now be appreciated from the foregoing, there is absent an accurate proportional relationship between the inter-source distance d (i.e. distance between the sound sources, e.g. A and B) and the pattern difference $D_{AB}^A$ or $D_{AB}^T$ which assume a value depending on the angle $\theta$ regardless of the predetermined disposition of the sound detectors as well as the predetermined position of the known sound source A. Besides, even when the angle $\theta$ is constant, neither the pattern difference $D_{AB}^A$ nor $D_{AB}^T$ will be in proportion to the inter-source distance d. Of course, there are cases in which an approximate proportionality can be found, as in the case of illustrative examples shown in FIGS. 2 and 4.

Accordingly, in order to determine accurately the inter-source distance d, the pattern difference $D_{AB}^A$ or $D_{AB}^T$ as determined has to be transformed into the inter-source distance in accordance with an expression which defines the relation between the pattern difference and the inter-source distance d. In the following, description will be directed to a manner in which the inter-source distance d between the sound sources A and B is determined on the basis of the pattern difference $D_{AB}^A$ or $D_{AB}^T$.

As discussed hereinbefore, the relation between the inter-source distance d and the pattern difference $D_{AB}^A$ is defined by the expression (10). When the coordinates of the N sound detectors as well as those of the known sound source A are given in the above expression (10), the distance $r_{Ai}$(i=1, 2, 3, ..., N) and the angle $\theta_i$(i=1, 2, ..., N) can be straight forwardly determined. In this connection, the expression (10) can be rewritten in the following form:

$$D_{AB}^A = f_A(d, \theta) \quad (12)$$

Accordingly, the expression for transforming the pattern difference $D_{AB}^A$ into the inter-source distance d, i.e. the distance between the sound sources A and B can be expressed as an inverse function of the expression (12). Namely, $$d = g_A(D_{AB}^A, \theta) \quad (13)$$

However, the expression (13) can not be derived in the form of an analytical expression from the expression (12) or from the more basic expression (10). Accordingly, resort is made to numerical calculation or determination by using an electronic computer.

More specifically, it is assumed that a structure to be monitored is of a cylindrical configuration, by way of example. This cylindrical structure is developed to a plane, as is illustrated in FIGS. 2 to 5. This plane is divided into a number of areas or meshes in a mesh-like pattern. On the basis of the distance d from the position of a known sound source to one mesh and an angle $\theta$ formed between a reference coordinate axis and a straight line interconnecting the sound source and the said one mesh, the pattern difference $D_{AB}^A$ at the position of the mesh in concern is arithmetically determined in accordance with the expression (10). In the similar manner, the pattern differences for the positions of all the other meshes are calculated, the results of which are placed in a memory or storage. The pattern differences thus determined for all the meshes (i.e. mesh-like areas) resulting from the imaginary division of the structure developed to a plane are previously stored in the memory. Accordingly, by reading out the mesh positions or meshes of an equal pattern difference, it is possible to form a closed curve around the known sound source. For example, meshes of ten different pattern differences may be represented by ten corresponding closed curves, as illustrated in FIG. 5. Accordingly, by setting the pattern differences $D_h$ (h=1, 2, ..., n) at an equal interval, assuming that the pattern difference of each mesh is equal to the one which is closest to the one of the h set values, and determining for each of the pattern differences the coordinate position of the mesh which is assumed equal to the pattern difference for all the angles $\theta$, there can be prepared a correspondence table as follows:

| Pattern Difference | Coordinates |
|---|---|
| $D_1$ | $(x_{11}, y_{11}), (x_{12}, y_{12}), (x_{13}, y_{13}), \ldots$ |
| $D_2$ | $(x_{21}, y_{21}), (x_{22}, y_{22}), (x_{23}, y_{23}), \ldots$ |
| . | . |
| . | . |
| . | . |
| $D_n$ | $(x_{n1}, y_{n1}), (x_{n2}, y_{n2}), (x_{n3}, y_{n3}), \ldots$ |

In this way, the memory stores therein the mesh positions of corresponding values for every pattern difference $D_h$ in a form of the correspondence table. When a pattern difference $D_{AB}^A$ is given, the set pattern difference $D_h$ which is closest to the given one is determined and the coordinates of a mesh having the pattern difference equal to the determined one $D_h$ is read out. The coordinate position as read out is represented by a magnitude corresponding to the real distance d. In other words, the coordinate position can be represented by $(d_{ij}, \theta_{ij})$ in a polar coordinate system.

Assuming now that a sound is generated by the unknown sound source B, the pattern difference $D_{AB}^A$ is calculated on the basis of the peak value data derived from the outputs of the various sound detector $S_i$(i=1, 2, ..., N) in accordance with the expression (1). Subsequently, the set pattern difference $D_h$ corresponding to the calculated pattern difference $D_{AB}^A$ is retrieved to read out offhand the coordinates of the mesh having the set pattern difference $D_h$. It is thus possible to depict a closed curve around the known sound source on the basis of the coordinate position data read out in this manner. The unknown sound source must be present on the closed curve as plotted. A method of determining where the unknown sound source is located on this closed curve will be described hereinafter.

As described hereinbefore, the relation between the inter-source distance d and the pattern difference $D_{AB}^T$ is defined by the expression (11). When the coordinates of the N sound detectors and the known sound source A are given, the distance $r_{Ai}$ and the angle $\theta_i$ ($i=1, 2, 3, \ldots, N$) can be naturally determined. More specifically, the expression (11) may be rewritten in the functional form as follows:

$$D_{AB}^T = f_T(d, \theta) \tag{14}$$

Accordingly, the expression required for transforming the pattern difference $D_{AB}^T$ to the inter-source distance d (i.e. distance between the sound sources) can be defined as a reverse function of the expression (14) as follows:

$$d = g_T(D_{AB}^T, \theta) \tag{15}$$

Although the expression (15) may be derived from the expression (14) or more basic expression (11), the expression (15) can not be analytically dealt with as in the case of the expression (13) but must be solved with the aid of a correspondence table which has been previously prepared through numerical operation as in the case of the aforementioned expression (13).

In the manner described above, the inter-source distance d is determined from the pattern difference $D_{AB}^A$ or $D_{AB}^T$.

Next, a sound source position evaluating or estimating apparatus according to an embodiment of the present invention will be described in conjunction with a pressure vessel to which the apparatus is applied for monitoring generation of abnormal sound.

Figure 6:
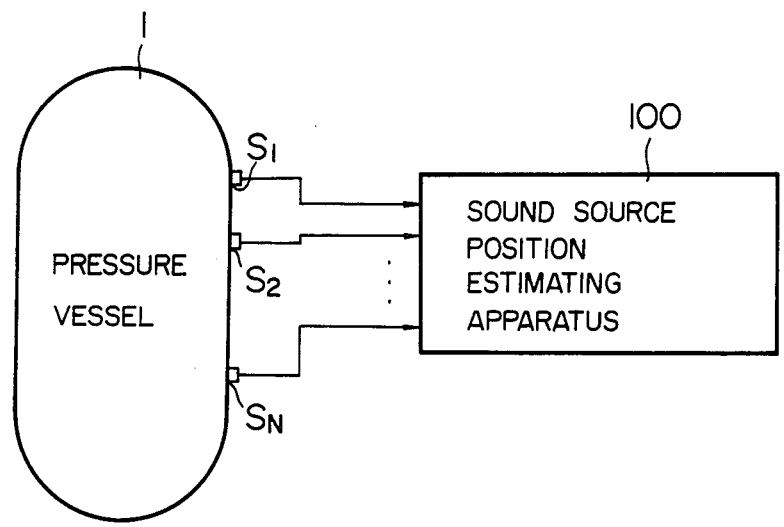
FIG. 6 is a schematic view showing a general arrangement of a sound source position estimating apparatus according to an embodiment of the invention together with a pressure vessel to be monitored by the apparatus as to generation of abnormal sound.
Figure 7:
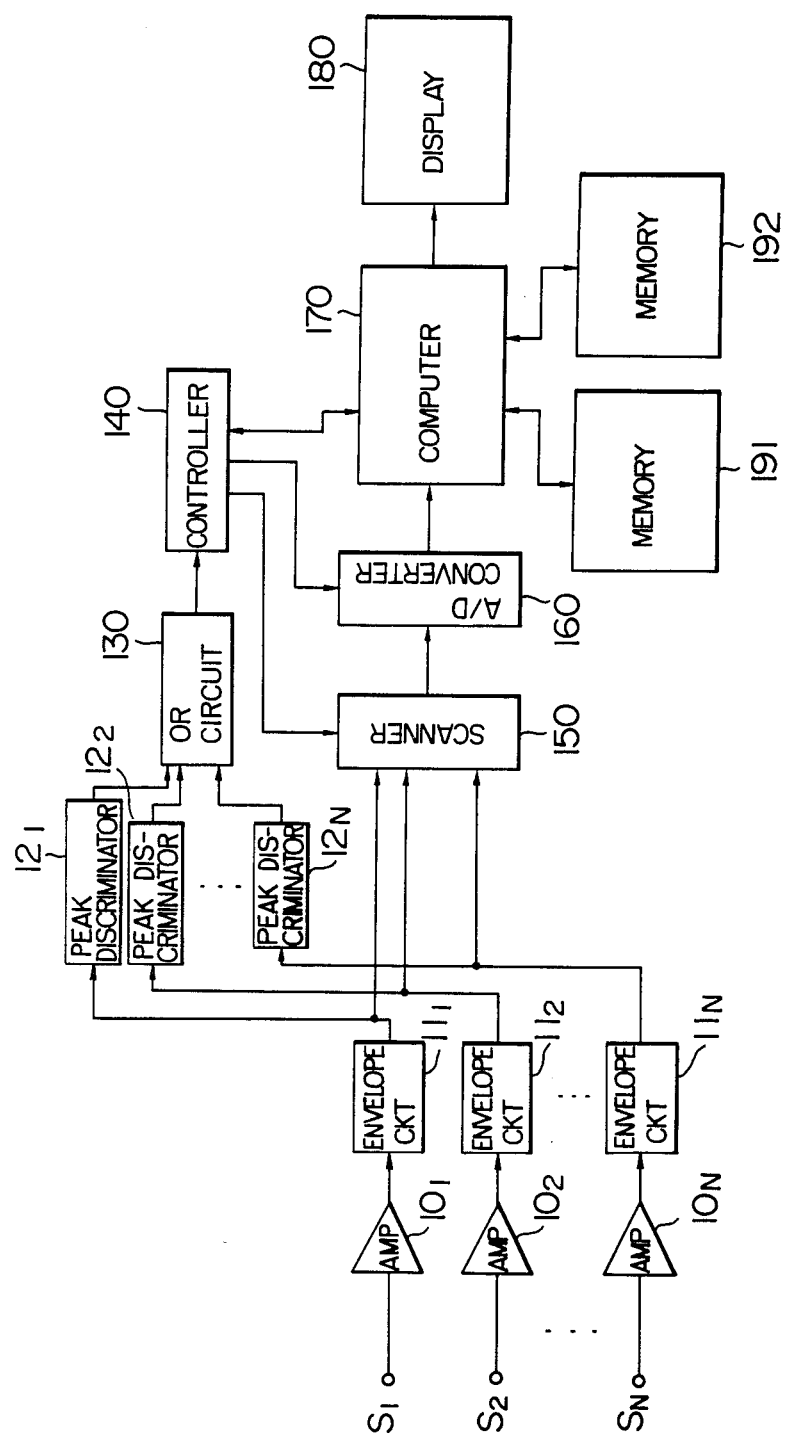
FIG. 7 is a block diagram showing an arrangement of a main portion of the sound source position estimating apparatus according to an embodiment of the invention.

FIG. 6 shows schematically a general arrangement of the sound source position evaluating apparatus together with the pressure vessel, while FIG. 7 is a block diagram showing in detail a typical configuration of a main portion of the sound source position evaluating or estimating apparatus. Referring to FIG. 6, it will be seen that N sound sensors or detectors $S_1, S_2, \ldots, S_N$ are mounted on an outer wall of the pressure vessel 1. The output signals produced by these detectors $S_i$ in response to a sound signal produced by a foreign or loose part within the vessel are supplied to a sound source position evaluating apparatus 100 which is realized in such a circuit configuration as shown in FIG. 7. The signals outputted from the detectors $S_1, S_2, \ldots, S_N$ are inputted to a scanner circuit 150 by way of amplifiers $10_i$ ($i=1, 2, \ldots, N$) and envelope circuits $11_i$ ($i=1, 2, \ldots, N$). The N input signals are sequentially sampled by the scanner 150 and supplied to an analog-to-digital (A/D) converter 160 to be converted into digital signals which are then inputted to a computer 170. In the computer 170, the signal arrival time points (which need not be the absolute time but may be time elapses from a given reference time point) and the peak values are arithmetically determined on the basis of the N waveform data supplied from the A/D converter 160. In this connection, it is necessary that any contradiction among the peak value data should be excluded by multiplying the data with gains of amplifiers or through the like measures.

The foregoing description is based on the assumption that only a single known sound source is employed. Accordingly, although it can be determined through the procedures described so far that an unknown sound source is located on a closed curve which encircles the known sound source, it is impossible to specify or locate definitely the position of the unknown sound source on the closed curve. In order to identify the position of the unknown sound source on the closed curve, the closed curves for at least three known sound sources have to be plotted. Then, the position of the unknown sound source is determined to be located at the intersection of these three closed curves. Accordingly, the following description will be made on the assumption that three or more known sound sources are employed.

Turning to FIG. 7, there are stored in a memory unit 191 the signal arrival time data and peak value data produced from the outputs of the various sound detectors in response to generation of sounds which may be effected by hammering the pressure vessel at three or more predetermined locations. In other words, these data for the positions of the known sound sources and the corresponding distance pattern data standardized as described hereinbefore are previously stored in the memory unit 191. More specifically, the memory unit 191 stores therein the known sound source positions $A_k$ ($k=1, 2, \ldots, K$) on or within the pressure vessel 1, the peak values $a_{ki}$ of the output signals from the i-th sound detector $S_i$ produced in response to the sounds generated at the known sound source positions $A_k$, respectively.

On the other hand, a memory unit 192 previously stores therein the aforementioned correspondence table for each of the known sound sources and each of the pattern differences on the basis of the calculated pattern differences $D_{AkB}^A$ or $D_{AkB}^T$ calculated for all the requisite meshes for each of the known sound sources $A_k$ in accordance with the expressions (10) and (11).

When signals from an unknown sound source B are inputted to the computer, the signal arrival time points $\tau_{Bi}$ and the peak values $b_i$ of the signals incoming from the unknown sound source B are arithmetically determined in the manner described hereinbefore. Additionally, arithmetic operations defined by the below mentioned expressions (16) and (17) are executed in conformance with the expressions (1) and (3) on the basis of the standardized pattern data stored in the memory unit 191, as the result of which the pattern differences $D_{AkB}^A$ or $D_{AkB}^T$ between the unknown sound source B and each of the known sound sources $A_k$ are arithmetically determined.

$$D_{AkB}^A = \left( \frac{\mathrm{Var}(\ln a_{ki} - \ln b_i)}{\sqrt{\mathrm{Var}(\ln a_{ki}) \cdot \mathrm{Var}(\ln b_i)}} \right)^{\frac{1}{2}} \tag{16}$$

$$D_{AkB}^T = \{\mathrm{Var}(\tau_{Aki} - \tau_{Bi})\}^{\frac{1}{2}} \tag{17}$$

After the pattern differences $D_{AkB}^A$ or $D_{AkB}^T$ have been arithmetically determined by the computer 170, the coordinate positions of all the meshes having the set pattern differences which correspond to the calculated pattern difference and which are equal to one another are read out from the memory unit 192 for each of the known sound sources to be displayed on a display unit 180. Subsequently, the inter-source differences $d_{AkB}^T$ or $d_{AkB}^T$ which correspond to the pattern differences $D_{AkB}^A$ or $D_{AkB}^T$ and which are given by the below mentioned expression (18) or (19), respectively, are read out from the memory unit 192 for each of all the angles $\theta$ of the meshes mentioned above and displayed on the display unit 180.

$$d_{AkB}^A = g_{AAk}(D_{AkB}^A, \theta) \tag{18}$$

$$d_{AkB}{}^T = g_{TAR}(D_{AkB}{}^T, \theta) \quad (19)$$

Figure 8:
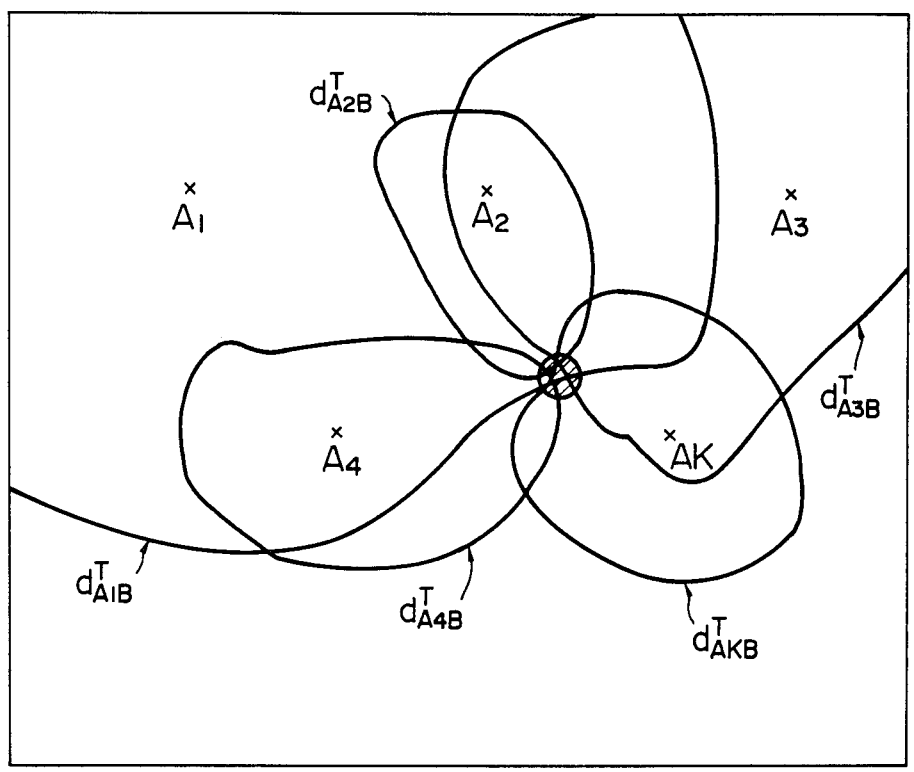
FIG. 8 is a view illustrating, by way of example, a manner in which an actual position of an unknown sound source is determined from pattern distances on a display device according to the teaching of the invention.

The inter-source difference data $d_{AkB}{}^A$ and $d_{AkB}{}^T$ read out in dependence on the angles $\theta$ are displayed on the display unit 180 in a manner illustrated in FIG. 8. More specifically, the known sound source positions $A_k$ are reproduced on the display device 180 and then the differences $d_{AkB}{}^T$ or $d_{AkB}{}^A$ are plotted, respectively, around the positions $A_k$ for each of the angles $\theta$. The traces of the intersource difference patterns $d_{AkB}{}^T$ or $d_{AkB}{}^A$ for every angle $\theta$ must in principle intersect one another at a single point. However, in practice, there may arise some error due to various noise components contained in the arrival time data and the peak value data. Consequently, the pattern difference usually contains more or less error, resulting in the traces of the inter-source pattern difference $d_{AkB}{}^T$ or $d_{AkB}{}^A$ plotted around the known sound source positions $A_i$ not always intersecting one another at a single point. It is however reasonably determined that the unknown sound source is positioned in an area where the traces are densely concentrated (the hatched area shown in FIG. 8).

Next, operation of the sound source position estimating apparatus described above will be elucidated with the aid of flow charts.

Figure 9:
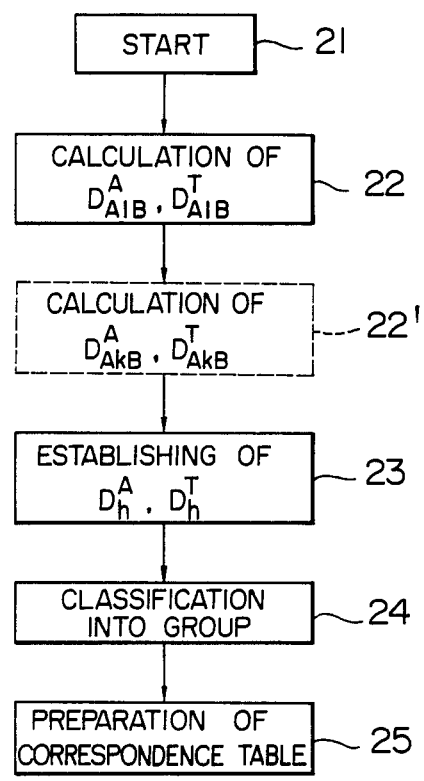
FIGS. 9 and 10 are views for illustrating flows of processings executed by a computer shown in FIG. 7.

FIG. 9 shows a flow chart for illustrating the preparation of the correspondence table. At a step 21, operation is started. At a step 22, the pattern differences $D_{A1B}{}^A$ and/or $D_{A1B}{}^T$ at every requisite mesh positions for the first known sound source $A_1$ are arithmetically determined in accordance with the expressions (10) and (11). In a similar manner, the pattern differences are calculated for each of the other known sound sources $A_k$ (step 22'). At a step 23, the maximum and minimum pattern differences are retrieved, whereby the span between these difference patterns is equally divided by n to establish the set pattern differences $D_h{}^A$ (h=1, 2, ..., n) and/or $D_h{}^T$ (h=1, 2, ..., n). At a step 24, the pattern differences $D_{AkB}{}^A$ and/or $D_{AkB}{}^T$ for each of the meshes are classified into groups in dependence on the set pattern differences $D_h{}^A$ and/or $D_h{}^T$, respectively, for each of the known sound sources. At a step 25, the coordinates of the corresponding meshes are stored for each of the known sound sources and each of the set pattern differences to thereby prepare the correspondence table.

Figure 10:
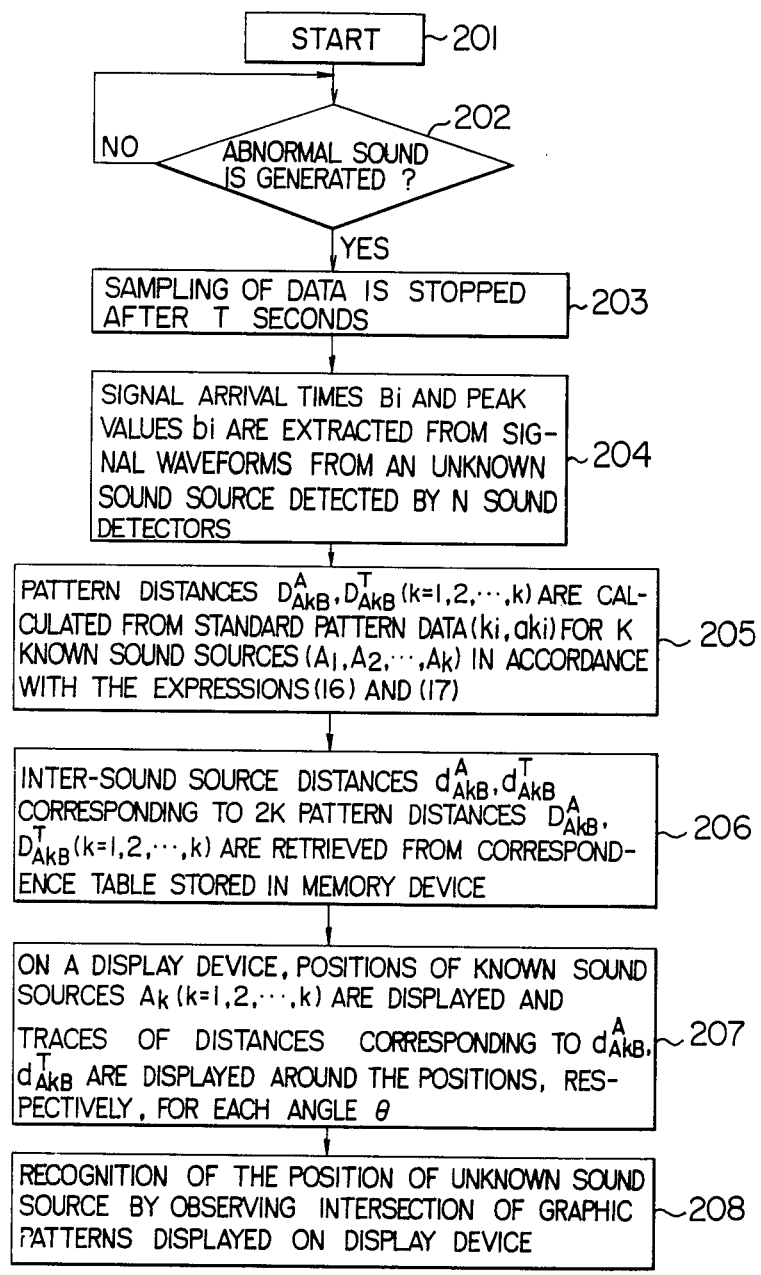

Next, a method of estimating an unknown sound source will be elucidated by referring to FIG. 10.

When a command for starting the operation of the apparatus is issued at a step 201, the computer 170, the controller 140, the scanner 150 and the A/D converter 160 are activated. At a next step 202, the output signals of the envelope circuits $11_1$ to $11_N$ are loaded as digital signals into a main memory device incorporated in the computer 170 at a predetermined sampling rate. In the main memory, storage areas each having a capacity of 1 k words are assigned as the data areas to the sound detectors, respectively. When the number of samplings exceeds the capacity of 1k words in each of the data areas, data is discarded sequentially starting from the oldest one so that fresh data may be written in the data area. Further, at the step 202, the presence or absence of generation of an abnormal sound is determined by means of the peak discriminating devices $12_1, 12_2, \ldots, 12_N$ and an OR circuit 130 (refer to FIG. 7) in synchronism with the data sampling. In the event that the peak value signal outputted by any one of the N sound detectors exceeds a value or level present in the peak discriminating devices $12_1, 12_2, \ldots, 12_N$, the corresponding signal is supplied to the controller 140 by way of the OR circuit 130, whereupon the processing proceeds to a step 203. At the step 203, the time elapsing since the transition from the step 202 is measured or counted. When the measured time exceeds a preset time duration T, the sampling operation is interrupted with the detected data being held. The time duration T should preferably be 20 ms to 50 ms in case the pressure vessel for a nuclear reactor is in concern.

At a succeeding step 204, the signal arrival time difference $\tau_{Bi}$ and the peak value $b_i$ of the unknown (abnormal) sound source B in concern are extracted from the signal waveform data of the individual sound detectors stored in the main memory, which data have been loaded in the main memory in the vicinity of the time point at which the abnormal sound was generated. At a step 205, the standardized pattern data is sequentially read out from the memory unit 191 to thereby determine the pattern difference $D_{AkB}{}^A$ or $D_{AkB}{}^T$ on the basis of the pattern data of the unknown sound source B in accordance with the expression (16) or (17).

At a next step 206, the trace data of the intersource difference $d_{AkB}{}^A$ of $d_{AkB}{}^T$ which corresponds to the pattern difference $D_{AkB}{}^A$ or $D_{AkB}{}^T$ determined at the step 205 and depends on the angle $\theta$ are read out from the correspondence table stored in the memory unit 206 in accordance with the expressions (18) or (19). The trace data thus read out is displayed on the display device 180 through a conventional display procedure together with the known sound source positions in a manner illustrated in FIG. 8. At a step 208, the operator is now in the position to identify the location or position of the unknown sound source.

Figure 11:
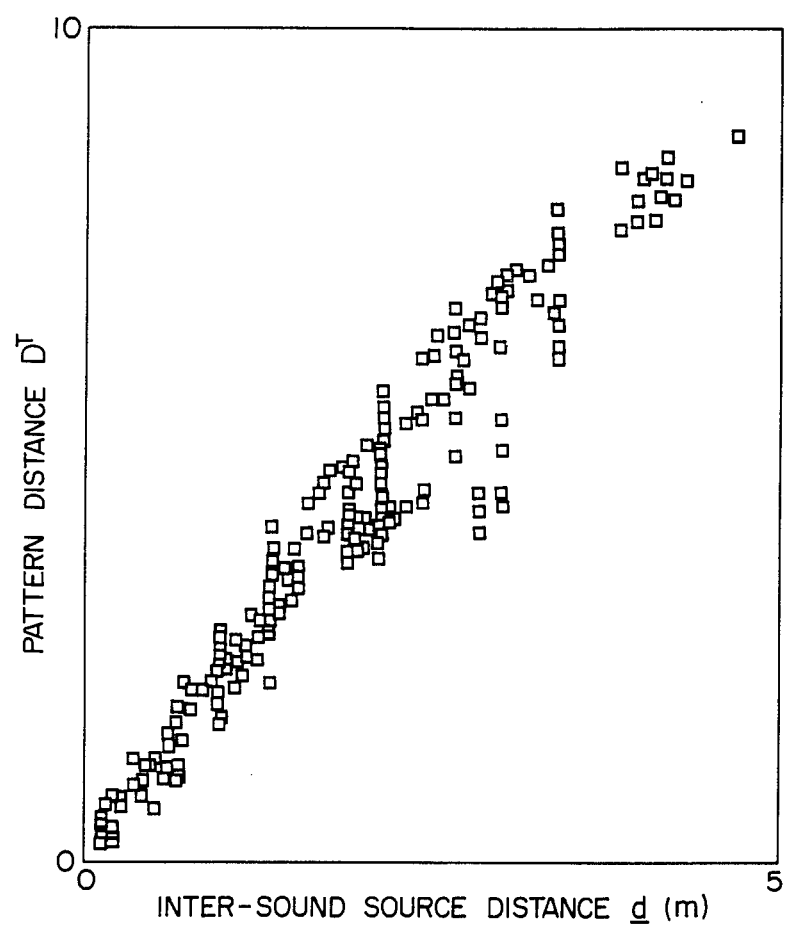
FIGS. 11 and 12 are views for illustrating comparatively the effect or results obtained by carrying out the invention.
Figure 12:
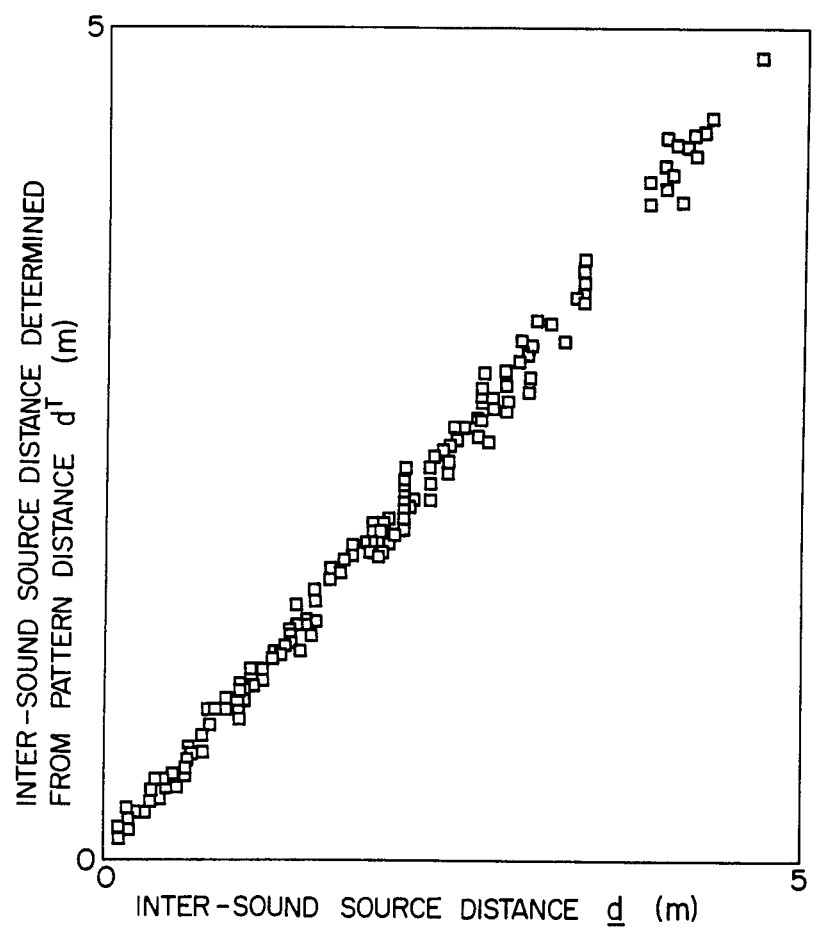

Finally, the advantages of the present invention over the prior art will be described with the aid of experimentally obtained data shown in FIGS. 11 and 12. In an experiment, a cylindrical steel vessel having a diameter 2 m and a height of 5 m was employed and eight sound detectors were mounted on the outer wall of the steel vessel at appropriate locations. Thereafter, the outer wall of the vessel was hammered at arbitrarily selected portions. The sound data obtained by the sound source estimating apparatus of the composition shown in FIG. 7 is illustrated in FIGS. 11 and 12. More particularly, in FIG. 11, the distances among the individual hammering points (sound sources), i.e. inter-source distances are taken along the abscissa while the corresponding arrival time pattern distances are taken along the ordinate whose value is however properly scaled by a scaling factor. As will be seen in FIG. 11, the pattern distance $D^T$ does not take a same value but assumes different values even for a same inter-source distance. On the other hand, referring to FIG. 12 which is a view similar to FIG. 11 and illustrates the results of transformation of the pattern distances to the inter-source distances in accordance with the expression (19) as taught by the present invention, it will be understood that the inter-source distance determined on the basis of the pattern distances as mentioned above represent the real or actual inter-source distance with a significantly improved accuracy. Of course, deviations remain to a small negligible extent, because of various errors involved in the course of obtaining the time data.

As will now be appreciated from the foregoing description, the invention teaches that the pattern distances which can be obtained through comparison or correlation of the data of the known sound sources with those of the unknown sound source is transformed to the real distances by referring to the correspondence table which contains the relations between the pattern differences and the real distances prepared previously. Accordingly, the present invention permits advantageously the position or location of an unknown sound source to be estimated with a high accuracy even when the pattern differences obtained as the measures for the real distances are not in proportion to the latter.

We claim:

1. An apparatus for estimating a position of a sound source, comprising:
   (a) a plurality of sound detecting means installed on a structure with a predetermined spacing for detecting a sound generated at a location in said structure;
   (b) first storage means for storing at least one of peak value data and signal arrival time data of sound signals originating in at least one known sound source position in said structure and obtained through said sound detecting means;
   (c) second storage means for storing a correspondence table indicating relations between pattern differences between said known sound source position and a number of predetermined positions of said structure and the real distances between said known sound source position and said number of predetermined positions;
   (d) pattern difference calculating means for arithmetically determining pattern differences on the basis of data stored in said first storage means and data of the sound signals originating in said unknown sound source position and detected through said detecting means which corresponds to data stored in said first storage means; and
   (e) signal processing means for reading said real distances from said correspondence table stored in said second storage means on the basis of the pattern differences arithmetically determined by said pattern difference calculating means.

2. A sound source position estimating apparatus according to claim 1, wherein said first storage means is loaded with the data of the sound signals originating in at least three known sound source positions, said second storage means being loaded with the correspondence tables each corresponding to each of said known sound source positions, said pattern difference calculating means being designed to arithmetically determine the pattern differences for every one of said known sound sources, and said signal processing means processing the signals relating to said real distances for every one of said known sound sources.

3. A sound source position estimating apparatus according to claim 2, wherein said signal processing means reads out said real distances over a whole periphery around each of said known sound sources.

4. A sound source position estimating apparatus according to claim 3, further including plotting means for plotting said real distances around each of said known sound source positions.

5. A sound source position estimating apparatus according to claim 4, wherein said plotting means is composed of a display device.

6. A sound source position estimating apparatus according to claim 1, wherein said pattern difference ($D_{AB}^A$ or $D_{AB}^T$) stored in said second storage means is arithmetically determined in accordance with at least one of the following expression:

$$D_{AB}^A = \left( \frac{\text{Var}\{\ln r_{Ai} - \frac{1}{2}\ln(r_{Ai}^2 + d^2 - 2r_{Ai}d\cdot\cos(\theta_i - \theta))\}}{\sqrt{\text{Var}(\ln r_{Ai}) \cdot \text{Var}[\frac{1}{2}\ln\{r_{Ai}^2 + d^2 - 2r_{Ai}d\cdot\cos(\theta_i - \theta)\}]}} \right)^{\frac{1}{2}}$$

or $$D_{AB}^T = \frac{1}{V} \cdot \{\text{Var}(r_{Ai} - \sqrt{r_{Ai}^2 + d^2 - 2r_{Ai}d\cdot\cos(\theta_i - \theta)}\,)\}^{\frac{1}{2}}$$

7. A sound source position estimating apparatus according to claim 1, wherein said pattern difference calculating means determines arithmetically the pattern difference in accordance with $$D_{AB}^A = \left\{ \frac{\text{Var}(\ln a_i - \ln b_i)}{\sqrt{\text{Var}(\ln a_i) \cdot \text{Var}(\ln b_i)}} \right\}^{\frac{1}{2}}$$

where Var represents variance which can be defined for a given quantity ($X_i$) as follows:

$$\text{Var}(X_i) = \frac{1}{N} \sum_{i=1}^{N} (X_i - \overline{X})^2$$

where N represents the number of said sound detectors and $\overline{X}$ is given by $$\overline{X} = \frac{1}{N} \sum_{i=1}^{N} X_i.$$

8. A sound source position estimating apparatus according to claim 1, wherein said pattern difference calculating means determines arithmetically the pattern difference in accordance with $$D_{AB}^T = \{\text{Var}(\tau_{Ai} - \tau_{Bi})\}^{\frac{1}{2}}$$

where Var represents variance which can be defined for a given quantity ($X_i$) as follows:

$$\text{Var}(X_i) = \frac{1}{N} \sum_{i=1}^{N} (X_i - \overline{X})^2$$

where N represents the number of said sound detectors and $\overline{X}$ is given by $$\overline{X} = \frac{1}{N} \sum_{i=1}^{N} X_i.$$

9. A sound source position estimating apparatus according to claim 1, wherein said pattern difference calculating means determines arithmetically the pattern difference in accordance with $$D_{AB}^C = (1-\alpha)D_{AB}^T + \alpha D_{AB}^A$$

where $$D_{AB}^A = \left\{ \frac{\text{Var}(\ln a_i - \ln b_i)}{\sqrt{\text{Var}(\ln a_i) \cdot \text{Var}(\ln b_i)}} \right\}^{\frac{1}{2}}$$

$$D_{AB}^T = \{\text{Var}(\tau_{Ai} - \tau_{Bi})\}^{\frac{1}{2}}$$

where Var represents variance which can be defined for a given quantity ($X_i$) as follows:

$$\mathrm{Var}(X_i) = \frac{1}{N} \sum_{i=1}^{N} (X_i - \overline{X})^2$$

where N represents the number of said sound detectors and $\overline{X}$ is given by $$\overline{X} = \frac{1}{N} \sum_{i=1}^{N} X_i, \text{ and}$$

$\alpha$ represents a factor of a value in the range of $0 \leq \alpha \leq 1$.

10. An apparatus for estimating a position of a sound source, comprising:
a plurality of sound detecting means installed on a structure with a predetermined spacing for detecting a sound generated at a location in said structure;
first storage means for storing at least one of peak value data and signal arrival time data obtained through detection of a sound originating in at least one known sound source position in said structure by means of said sound detecting means;
second storage means for storing a correspondence table containing data indicating the correspondences between pattern differences between said known sound source position and a number of predetermined positions of said structure and the real distances between said known sound source position and said number of predetermined positions;
pattern difference calculating means for arithmetically determining said pattern differences on the basis of data stored in said first storage means and data of the sound signals originating in said unknown sound source position and detected through said detecting means which corresponds to data in said first storage means; and
signal processing means for reading the corresponding position on said structure from said correspondence table stored in said second storage means on the basis of the pattern differences arithmetically determined by said pattern difference calculating means.

11. A method of estimating a location of an unknown sound source in a structure to be monitored, wherein sounds originating in at least three known sound source positions are detected by a plurality of sound detecting means, at least one of peak value data and signal arrival time data derived from a sound signal detected by said sound detecting means is stored in storage means for each of said known sound source positions, and the position of said unknown sound source is estimated by comparing data of the sound signal originating in said unknown sound source and detected by said sound detecting means with the data stored in said storage means, further comprising:
a step of arithmetically determining pattern differences from said known sound source positions for a number of predetermined positions, respectively, on the basis of data stored in said storage means;
a step of preparing and storing correspondence tables indicating relations between said pattern differences and real distances between said known sound source positions and said predetermined position;
a step of calculating the pattern differences on the basis of the sound signal data derived from said unknown sound source positions and said data stored in said storage means;
a step of reading said real distances for said known sound sources, respectively, from said correspondence table on the basis of said calculated pattern differences; and
a step of estimating the location of said unknown sound source from said real distances read out from said storage means.

* * * * *